United States Patent
Farrar et al.

(10) Patent No.: US 11,905,854 B2
(45) Date of Patent: Feb. 20, 2024

(54) TWO-PIECE BAFFLE

(71) Applicant: RAYTHEON TECHNOLOGIES CORPORATION, Farmington, CT (US)

(72) Inventors: Bryan H. Farrar, West Hartford, CT (US); Jon E. Sobanski, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/971,999

(22) Filed: Oct. 24, 2022

(65) Prior Publication Data

US 2023/0053047 A1 Feb. 16, 2023

Related U.S. Application Data

(62) Division of application No. 16/676,949, filed on Nov. 7, 2019, now Pat. No. 11,506,063.

(51) Int. Cl.

| *F01D 9/06* | (2006.01) |
|---|---|
| *B33Y 80/00* | (2015.01) |

(Continued)

(52) U.S. Cl.
CPC .............. *F01D 9/065* (2013.01); *B22F 10/28* (2021.01); *B23P 15/04* (2013.01); *B33Y 80/00* (2014.12);

(Continued)

(58) Field of Classification Search
CPC .......... F01D 5/189; F01D 5/147; F01D 5/188; F01D 5/18; F01D 5/184; F01D 9/065;

(Continued)

(56) References Cited

U.S. PATENT DOCUMENTS

| 3,388,888 A | 6/1968 | Kercher et al. |
|---|---|---|
| 3,726,604 A | 4/1973 | Helms et al. |

(Continued)

FOREIGN PATENT DOCUMENTS

| EP | 3144479 | 3/2017 |
|---|---|---|
| GB | 2097479 | 11/1982 |

OTHER PUBLICATIONS

The Extended European Search Report for European Patent Application No. 20205740.2, dated Mar. 19, 2021.

*Primary Examiner* — Eric J Zamora Alvarez
(74) *Attorney, Agent, or Firm* — Carlson, Gaskey & Olds, P.C.

(57) ABSTRACT

An airfoil vane includes an airfoil section which includes an outer wall that defines an internal cavity. A baffle is situated in the internal cavity. The baffle includes a leading edge portion and a trailing edge portion which is bonded to the leading edge portion at a joint. The leading edge portion and the trailing edge portion define an internal cavity therewithin. Both the leading edge portion and the trailing edge portion include a plurality of cooling holes which are configured to provide cooling air to the airfoil outer wall. The trailing edge portion is formed of sheet metal and the leading edge portion is formed of non-sheet-metal. A method of making a baffle for a vane arc segment and a method of assembling a ceramic matrix composite airfoil vane are also disclosed.

20 Claims, 5 Drawing Sheets

(51) Int. Cl.
    *F01D 5/18*           (2006.01)
    *B22F 5/00*          (2006.01)
    *B22F 5/04*          (2006.01)
    *B22F 10/28*        (2021.01)
    *B23P 15/04*        (2006.01)

(52) U.S. Cl.
    CPC ............... *F01D 5/18* (2013.01); *F01D 5/189* (2013.01); *F05D 2220/32* (2013.01); *F05D 2230/50* (2013.01); *F05D 2230/60* (2013.01); *F05D 2300/6033* (2013.01)

(58) Field of Classification Search
    CPC .......... F01D 9/041; B33Y 80/00; B23P 11/02; B23P 2700/06; F05D 2230/60; F05D 2240/24; F05D 2260/201; F05D 2260/35; F05D 2260/38; F05D 2230/54; F05D 2220/32; F05D 2230/50; F05D 2300/6033; F05D 2230/22; F05D 2230/234; F05D 2230/31; F05D 2230/51; F05D 2250/27; F05D 2260/37
    See application file for complete search history.

(56) References Cited

U.S. PATENT DOCUMENTS

| | | |
|---|---|---|
| 3,767,322 A | 10/1973 | Durgin et al. |
| 4,025,226 A | 5/1977 | Hovan |
| 4,252,501 A | 2/1981 | Peill |
| 4,257,734 A | 3/1981 | Guy et al. |
| 4,437,810 A | 3/1984 | Pearce |
| 4,697,985 A | 10/1987 | Suzuki |
| 5,259,730 A | 11/1993 | Damlis et al. |
| 5,511,937 A | 4/1996 | Papageorgiou |
| 6,554,563 B2 | 4/2003 | Noe et al. |
| 8,500,405 B1 | 8/2013 | Jones et al. |
| 9,238,968 B2 | 1/2016 | Harding et al. |
| 9,982,543 B2 | 5/2018 | Spangler |
| 10,053,996 B2 | 8/2018 | Spangler |
| 2010/0104461 A1 | 4/2010 | Smith et al. |
| 2014/0219788 A1 | 8/2014 | Nilsson |
| 2017/0058679 A1* | 3/2017 | Spangler ................. B23P 15/02 |
| 2017/0081966 A1 | 3/2017 | Huizenga et al. |
| 2017/0145833 A1 | 5/2017 | Thornton |
| 2017/0356296 A1* | 12/2017 | Tibbott ................... F01D 5/188 |
| 2018/0274377 A1 | 9/2018 | Kington et al. |
| 2018/0371920 A1 | 12/2018 | Packer et al. |

\* cited by examiner

TWO-PIECE BAFFLE

CROSS-REFERENCE TO RELATED APPLICATIONS

This application is a divisional of U.S. patent application Ser. No. 16/676,949 filed on Nov. 7, 2019, which is hereby incorporated by reference herein in its entirety.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Any of the fan section, the turbine section, and the compressor section include airfoils, such as for fan, compressor, or turbine blades. Baffles are known and used in cooled gas turbine engine airfoils, such as turbine vanes. Typically, a baffle is situated in a cavity in the airfoil and serves to distribute cooling air to precise locations in the airfoil.

SUMMARY

An airfoil vane according to an example of this disclosure includes an airfoil section which includes an outer wall that defines an internal cavity. A baffle is situated in the internal cavity. The baffle includes a leading edge portion and a trailing edge portion which is bonded to the leading edge portion at a joint. The leading edge portion and the trailing edge portion define an internal cavity therewithin. Both the leading edge portion and the trailing edge portion include a plurality of cooling holes which are configured to provide cooling air to the airfoil outer wall. The trailing edge portion is formed of sheet metal and the leading edge portion is formed of non-sheet-metal.

In a further example of the foregoing, the leading edge portion includes a neck forward of the joint.

In a further example of any of the foregoing, the joint includes a step formed on the leading edge portion. A forward edge of the leading edge of the trailing edge portion is disposed in the step.

In a further example of any of the foregoing, the step is disposed inside the trailing edge portion.

In a further example of any of the foregoing, the step defines a weld surface. The weld surface has a length L that is between about 0.008 and 0.125 inches (0.020 and 0.32 cm).

In a further example of any of the foregoing, the leading edge portion is sintered metal.

In a further example of any of the foregoing, the trailing edge portion is situated near a trailing edge of the airfoil section. A width of the trailing edge of the airfoil section is less than about 0.01 inches (0.254 cm).

In a further example of any of the foregoing, the leading edge portion includes standoffs which extend from a wall of the leading edge portion.

A method of making a baffle for a vane arc segment according to an example of this disclosure includes forming a trailing edge portion of a baffle from sheet metal, forming a leading edge portion of the baffle by additive manufacturing, and bonding the leading edge portion to the trailing edge portion at a joint.

In a further example of the foregoing, an airfoil vane is measured. The airfoil vane is configured to receive the baffle, to determine the dimensions of the airfoil vane, and form the leading edge portion based on the dimensions.

In a further example of any of the foregoing, the leading edge portion includes forming first and second sides of the leading edge portion and connect the first and second sides.

In a further example of any of the foregoing, the leading edge portion is formed and includes making the leading edge portion as a single piece component.

In a further example of any of the foregoing, the leading edge portion is formed and includes making cooling holes in the leading edge portion.

In a further example of any of the foregoing, the leading edge portion is formed and includes forming standoffs. The standoffs extend from a wall of the leading edge portion.

In a further example of any of the foregoing, the bonding includes bonding a forward edge of the trailing edge portion to a step formed in the leading edge portion.

A method of assembling a ceramic matrix composite airfoil vane according to an example of this disclosure includes inserting a baffle into a central cavity of a ceramic matrix composite airfoil. The central cavity is defined by an airfoil outer wall. The baffle includes a leading edge portion and a separate trailing edge portion is connected to the leading edge portion at a joint. The leading edge portion and the trailing edge portion define an internal cavity therewithin. Both the leading edge portion and the trailing edge portion include a plurality of cooling holes which are configured to provide cooling air to the airfoil outer wall. The trailing edge portion is formed from sheet metal.

In a further example of the foregoing, the method includes making the leading edge portion by additive manufacturing.

In a further example of any of the foregoing, the method includes making the leading edge portion, which includes making first and second sides of the trailing edge portion and connecting the first and second sides.

In a further example of any of the foregoing, the leading edge portion includes a neck forward of the joint.

In a further example of any of the foregoing, the joint includes a step formed on the leading edge portion. The step is configured to receive a forward end of the trailing edge portion.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
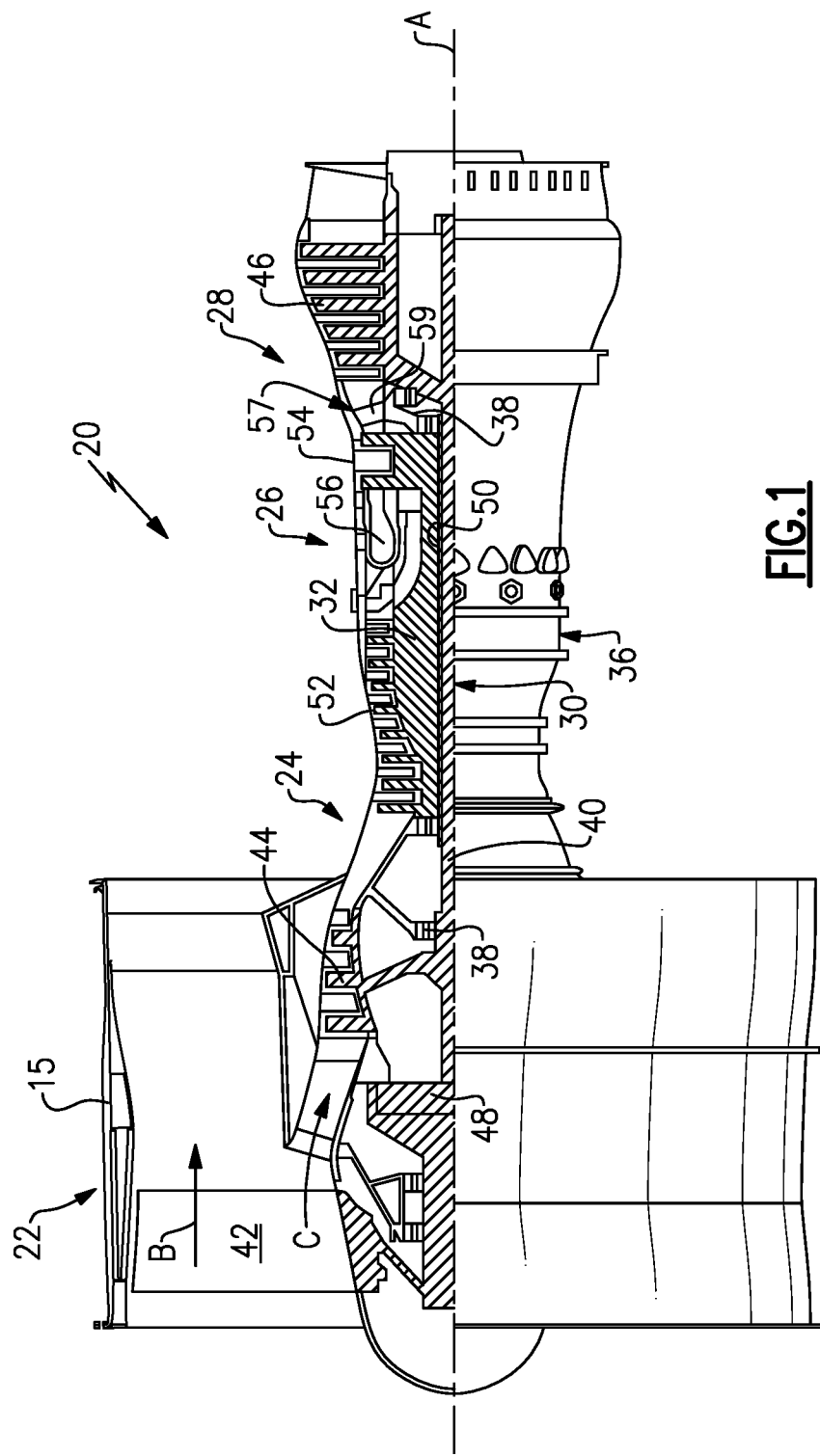
FIG. 1 schematically shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. Terms such as "axial," "radial," "circumferential," and variations of these terms are made with reference to the engine central axis A. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
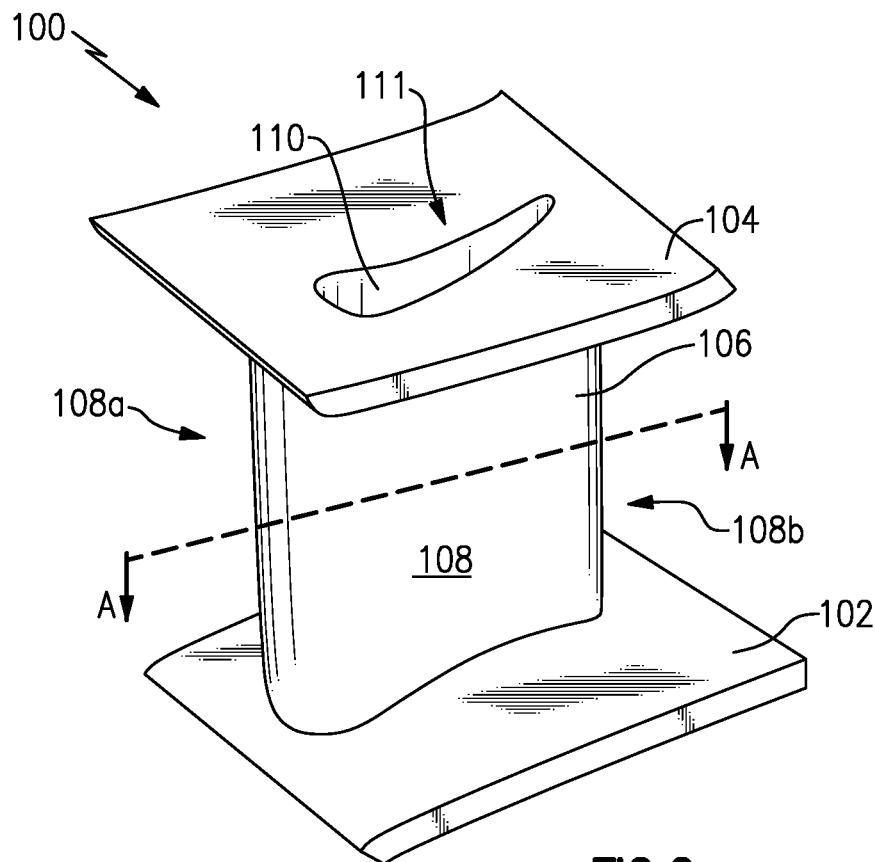
FIG. 2 schematically shows an airfoil assembly for the gas turbine engine of FIG. 1.
Figure 3:
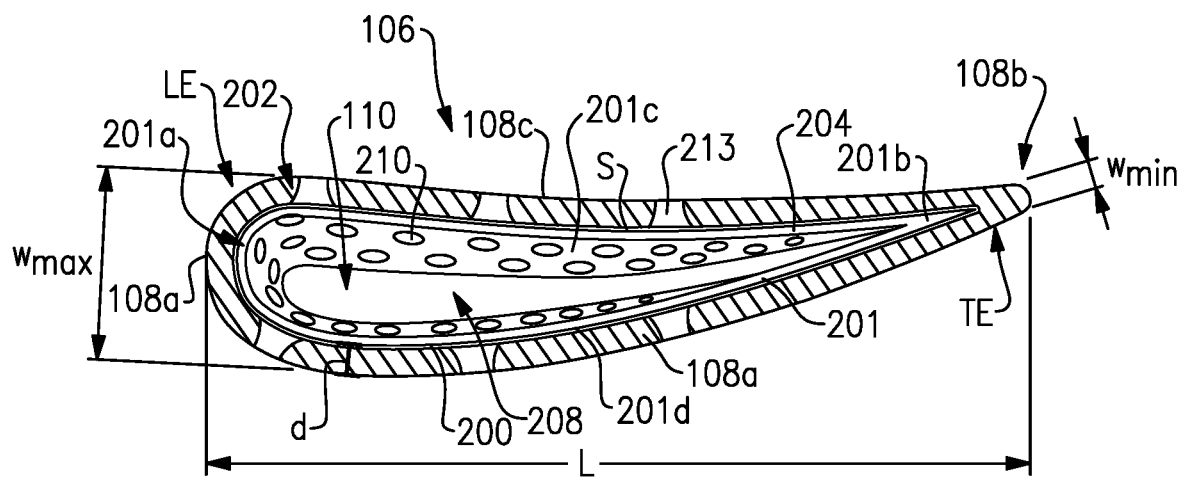
FIG. 3 schematically shows a cross-section of the airfoil assembly of FIG. 2.

FIG. 2 schematically shows an airfoil vane 100 from the turbine section 28 of the engine 20. A plurality of airfoil vanes 100 are situated in a circumferential row about the engine central axis A. The airfoil vane 100 includes a first or inner platform 102, a second or outer platform 104, and an airfoil section 106 that spans between the inner and outer platforms 102/104. FIG. 3 shows a cross-sectional view of the airfoil section 106 along the section line A-A in FIG. 2. The airfoil section 106 includes an airfoil outer wall 108 that delimits the profile of the airfoil section 106. The outer wall 108 defines a leading edge 108a, a trailing edge 108b, and first and second sides 108c/108d that join the leading and trailing edges 108a/108b. In this example, the first side 108c is a pressure side and the second side 108d is a suction side. The outer wall 108 circumscribes an internal cavity 110. The cavity 110 may be a single cavity or a sub-cavity, for example.

In one example, the airfoil vane 100 is formed of a ceramic material, such as a ceramic matrix composite (CMC) material. For example, the CMC includes a ceramic matrix and ceramic fibers disposed in the ceramic matrix. The ceramic matrix may be, but is not limited to, silicon carbide (SiC) and the ceramic fibers may be, but are not limited to, silicon carbide (SiC) fibers. The CMC is comprised of fiber plies that are arranged in a stacked configuration and formed to the desired geometry of the airfoil vane 100. For instance, the fiber plies may be layers or tapes that are laid-up one on top of the other to form the stacked configuration. The fiber plies may be woven or unidirectional, for example. At least a portion of the fiber plies are continuous through the platforms 102/104 and the airfoil section 106. In this regard, the airfoil vane 100 is a continuous body in that the fiber plies are uninterrupted through the platforms 102/104 and the airfoil section 106. The airfoil vane 100 may also be a monolithic ceramic material, such as a silicon-containing ceramic. Examples of such ceramics include silicon nitride and silicon carbide.

In another example, the airfoil vane 100 is formed of a metallic material, such as a nickel- or cobalt-based superalloy.

FIG. 3 shows a cross-section of the airfoil vane 100 along the section line A-A shown in FIG. 2. The airfoil section 106 has a maximum width Wmax, which is typically near the leading edge LE and a minimum width Wmin, which is typically near the trailing edge TE. The maximum and minimum widths Wmax and Wmin are defined in a direction perpendicular to a camber line L of the airfoil section 106. The widths Wmax and Wmin are on the order of fractions of an inch. For instance, the maximum width Wmax is between about 0.1 and 1 inches (0.254 cm and 2.54 cm) and the minimum width Wmin is between about 0.0001 and 0.115 inches (0.00254 and 2.921 mm). The airfoil section 106 has a length L between the leading and trailing edges of about 0.5 to 2 inches (1.27 and 2.08 cm). As shown in the radially-outer-to-inner view FIG. 3, the geometry of the airfoil section 106 is such that the widths Wmax and Wmin decrease in the radial direction, e.g., the widths Wmax and Wmin are larger at the radially outer end of the airfoil section 106 than at the radially inner end.

Figure 4:
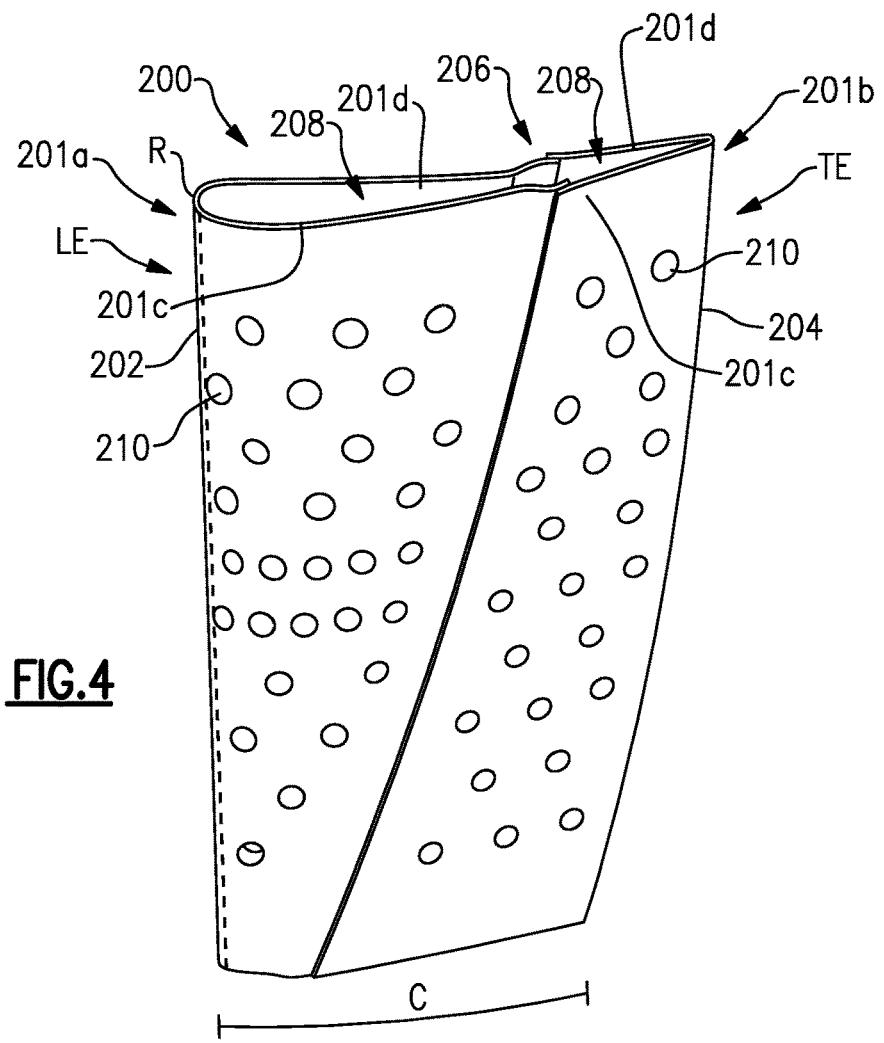
FIG. 4 schematically shows a baffle for the airfoil assembly of FIGS. 2-3.

The airfoil vane 100 in FIG. 3 includes a baffle 200, which is also shown in an isolated view in FIG. 4. The baffle 200 is situated in the internal cavity 110 and is spaced away from the airfoil outer wall 108 by a distance d to define a space S therebetween.

The baffle 200 includes a wall 201 that delimits the profile of the baffle 200. The wall 201 defines a leading edge 201a, a trailing edge 201b, and first and second sides 201c/201d that join the leading and trailing edges 201a/201b. The baffle 200 includes a leading edge (LE) portion 202 and a trailing edge (TE) portion 204 that correspond to the leading and trailing edges of the airfoil vane 100 (FIGS. 2-3), respectively. The leading and trailing edge portions 202/204 are joined at a joint 206 (FIG. 4). The leading and trailing edge portions 202/204 together define an internal cavity 208. The baffle wall 201 includes cooling holes 210 in both the leading and trailing edge portions 202/204, including in areas near the trailing edge TE of the airfoil vane 100.

In some examples, one or both of the leading and trailing edge portions 202/204 include standoffs, such as the standoffs 213 (shown in FIG. 3). In this example, the standoffs 213 extend outwards from an outer face of the leading/trailing edge portions 202/204 into the space S. The standoffs 213 maintain the distance d and thus the space S, as discussed above.

Some baffles lack cooling holes in the area near the trailing edge TE of the airfoil, due to manufacturing limitations, for example. This means that that there is a portion of the baffle that does not provide impingement cooling at the airfoil trailing edge TE. For such baffles, there is reduced cooling efficiency of the airfoil section at its trailing edge TE as compared to the leading edge LE. The baffle 200, however, provides improved cooling to the trailing edge TE of the airfoil vane 100 as compared to baffles that lack cooling holes near the trailing edge TE.

The internal cavity 208 receives cooling air, such as bleed air from the compressor 24 (FIG. 1). The cooling air exits the cooling holes 210 of the baffle 200 to provide impingement cooling on the inside surface of airfoil outer wall 108.

Additive manufacturing methods can be used to form "classified" baffles 200, which are dimensioned specifically for a particular airfoil vane 100. Airfoil vanes 100 are relatively small, and in some cases, have a manufacturing tolerance that is relatively large with respect to the overall size of the airfoil vane 100. Accordingly, airfoil vanes 100 may slightly differ in dimensions from vane to vane. In this regard, the baffle 200 is a classified baffle that is additively manufactured for a specific airfoil vane 100 by measuring the airfoil vane 100 and using the measurements to specify the dimensions of the classified baffle 200. Additive manufacturing provides the flexibility to customize the dimensions of each baffle 200 for a given airfoil vane 100.

In general, additive manufacturing includes depositing a powder material, and using a laser to sinter the powdered material into a layer of sintered metal that has a desired two-dimensional shape. Successive layers of powder are deposited and sintered to form a desired three-dimensional shape. Example additive manufacturing methods include DMLS (direct metal laser sintering), SLM (selective laser melting), laser powder bed fusion (LPBF), or any other known technique.

Additive manufacturing techniques have certain size limitations, e.g., in order to maintain structural integrity of a component during a build, the component walls must have a certain minimum thickness. As discussed above, the trailing edge TE of the airfoil section 106 has a small width dimension. Accordingly, the baffle 200 for the airfoil section 106 has correspondingly thin walls 201c/201d near its trailing edge TE so that the cavity 208 extends through substantially all of the trailing edge portion 204 and cooling holes 210 can provide impingement cooling near the trailing edge TE of the airfoil section 106. In some examples, the required width of the baffle walls 201c/201d may be smaller than the minimum width requirement for a given additive manufacturing technique. Therefore, the trailing edge portion 204 is formed from sheet metal, which can be provided in thicknesses that are less than the minimum width requirement for additive manufacturing. Furthermore, sheet metal allows for more flexibility in cooling hole 210 placement than additive manufacturing because the cooling holes 210 can be formed in sheet metal prior to shaping the trailing edge section 204. In additive manufacturing, cooling holes must be built a minimum distance apart to maintain the structural integrity of the component during the build. Sheet metal has a smaller minimum distance for cooling hole placement than additive manufacturing. As discussed in more detail below, additive manufacturing has certain minimum cooling hole spacing requirements to maintain structural integrity of the component during the build.

Figure 5:
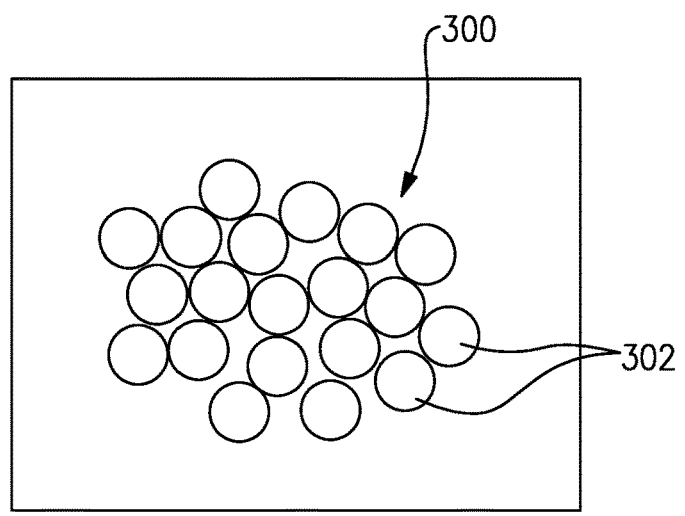
FIG. 5 schematically shows representative sintered metal particles.

In order to take advantage of the benefits of additive manufacturing, such as the ability to make classified baffles as discussed above, along with reduced cost and manufacturing time, the leading edge portion 202 is formed by additive manufacturing. As shown in a representative view in FIG. 5, the leading edge portion 202 is formed of sintered metal 300 that is comprised of sintered particles 302. As shown in FIG. 2, the width Wmax near the leading edge LE is larger than the width Wmin near the trailing edge TE. Accordingly, the wall thickness of the leading edge portion 202 can be thicker than the wall thickness of the trailing edge portion 204. For example, the wall thickness for the leading edge portion 202 can be greater than the minimum wall thickness for a given additive manufacturing technique. Therefore, the leading edge LE portion 202 can be manufactured by additive manufacturing.

In general, the leading edge portion 202 is manufactured in a build direction from a radially inward end of the baffle 200 towards a radially outward end of the baffle 200. The leading edge portion 202 can be manufactured as a single piece component, or the sides 201c/201d can be manufactured separately and joined together by welding or any other known method.

Cooling holes 210 can be formed in the leading edge portion 202 during the additive manufacturing, or can be added after by any known method. Standoffs, such as the standoffs 213, shown in FIG. 3, can also be built into the leading edge portion 202 during additive manufacturing. In this example, the standoffs 213 extend outwards from an outer face of the leading edge portion 202 into the space S. The standoffs 213 maintain the distance d and thus the space S, as discussed above.

In this way, the baffle 200 takes advantage of both the sheet metal trailing edge portion 204, e.g., flexibility in cooling hole 210 placement and thin wall 201 thickness, and the additive manufacturing leading edge portion 202, e.g., fast and cost effective manufacturing that can be classified to a particular airfoil section 106 and account for manufacturing tolerances for the airfoil section 106.

Referring back to FIG. 4, the baffle 200 has a chord length C that can be expressed as a percentage (% C), where 0% represents the leading edge LE and 100% represents the trailing edge TE of the baffle 200. As discussed above, the airfoil section 106 has a width that decreases from its radially outer end to its radially inner end. To that end, joint 206 begins at a larger % C at the radially inner end of the baffle 200 and ends at a smaller % C at the radially outer end of the baffle 200. Accordingly, the trailing edge portion 204 takes up a larger % C of the baffle 200 than the leading edge portion 202 near the radially inner end, and the opposite is true at the radially outer end. Because the width is smaller at the radially inner end, making a larger portion of the radially inner end from sheet metal allows for capturing the benefits discussed above.

Though in the example of FIG. 4 the joint 206 is at the same % C for both sides 201c/201d of the baffle wall 201 at and given radial point. However, in other examples, the % C of the joint could be different for each side 201c/201d, e.g, the trailing edge portion 204 could make up a larger % C of one side 201c/201d than the other.

Figure 6B:
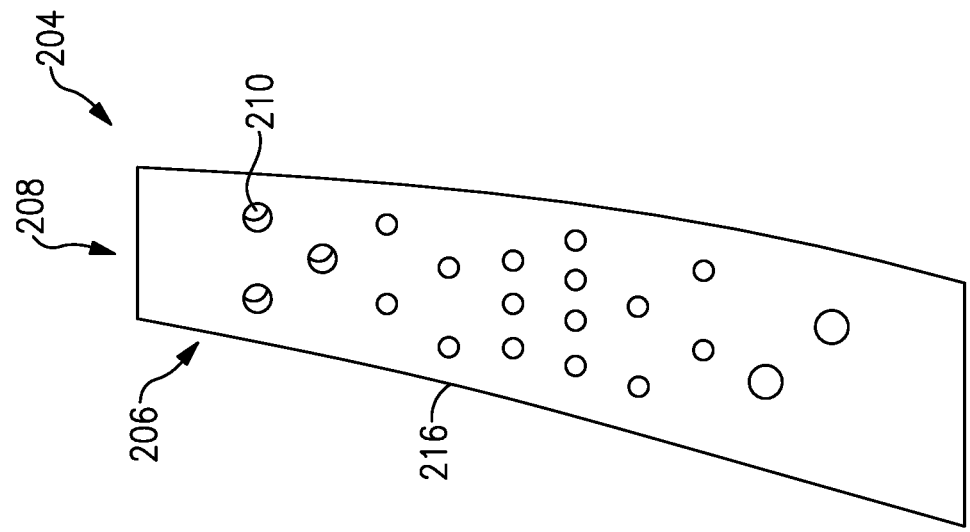
FIG. 6B schematically shows a trailing edge portion of the baffle of FIG. 4.
Figure 6A:
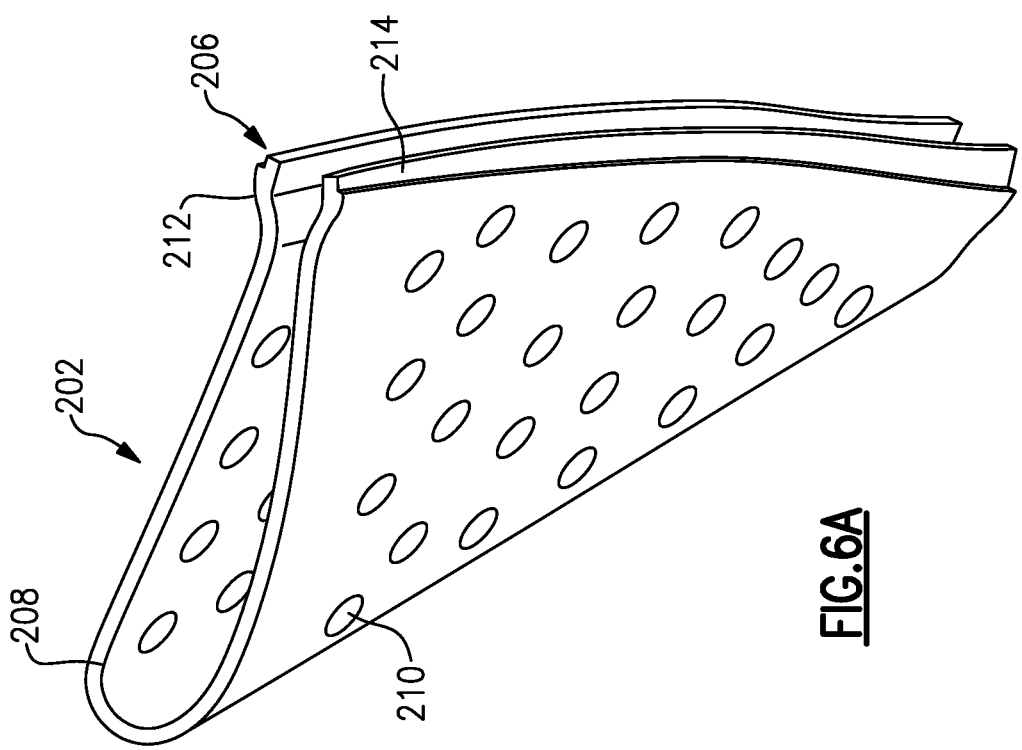
FIG. 6A schematically shows a leading edge portion of the baffle of FIG. 4.

FIGS. 6A-B show profile views of the leading and trailing edge portions 202/204, respectively. As shown, the leading edge portion 202 has a neck 212 near the joint 206 and aftward (e.g., towards the trailing edge) of the joint 206. The neck 212 has an increased width. Generally, the cooling air in space S flows in an aftward direction, e.g., towards the trailing edge TE of the airfoil section 106. The neck 212 serves to disrupt cooling air flow in the space S when the baffle 200 is situated in an airfoil section 106 (FIG. 2), which can control the characteristics of the cooling air flow in order to improve cooling efficiency for the airfoil outer wall 108.

Figure 7:
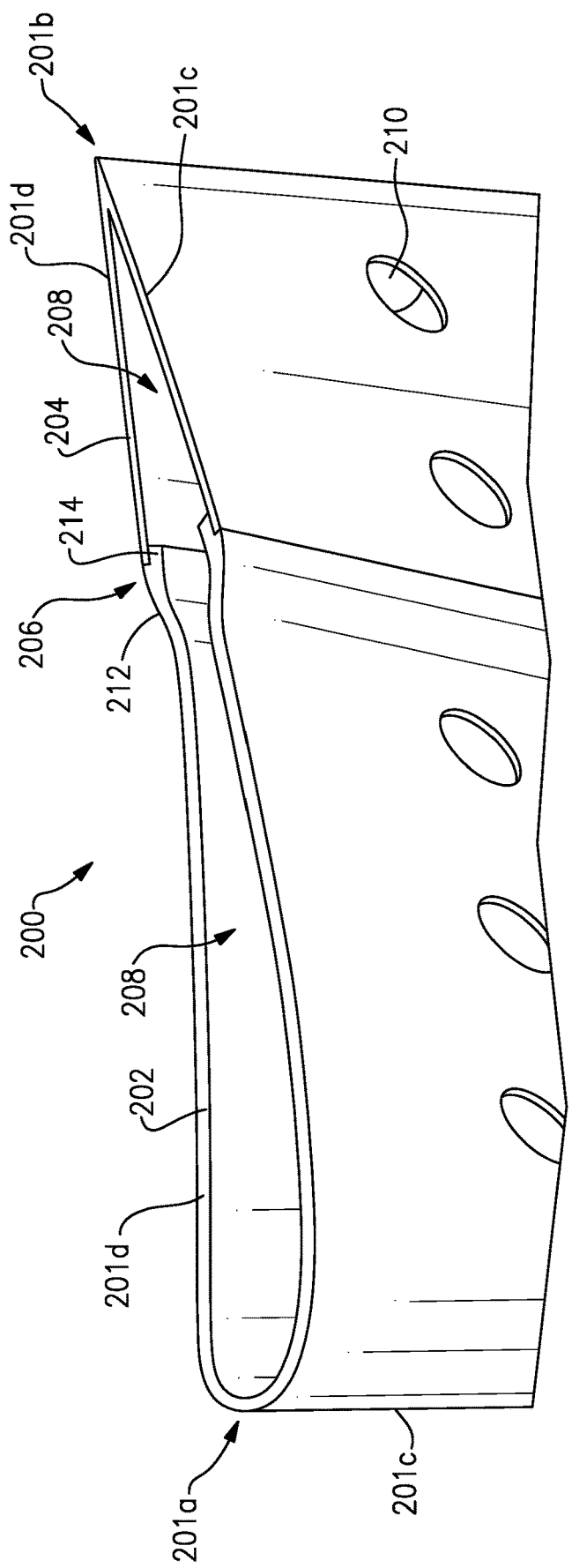
FIG. 7 schematically shows a detail view of the baffle of FIG. 4.

The neck portion 212 includes a step 214. A forward edge 216 of the trailing edge portion 204 is disposed in the step 214. In one example, the step 214 defines a weld surface with a length L that is between about 0.008 and 0.125 inches (0.020 and 0.32 cm). The bonding can be by welding, brazing, or any known method suitable for the material of the leading and trailing edge portions 202/204. As shown in the detail view of FIG. 7, the step 214 is disposed inside the trailing edge portion 204 to form a smooth other surface at the joint 206 when the leading and trailing edge portions 202/204 are bonded. The neck 212 and step 214 can be formed during the additive manufacturing of the leading edge portion 202, or can be machined into the leading edge portion 202 after additive manufacturing.

The baffle 200 can be inserted into a seated positon in the airfoil section 106 from an opening 111 in the outer platform 104, shown in FIG. 2. In the example of FIG. 2, the opening 111 is in the outer platform 104, but in another example, the opening can be in the inner platform 102. Once seated, the baffle 200 is then secured in place, such as to the airfoil vane 100 or another adjacent structure in the engine 20. Such an installation of the baffle 200 into the airfoil section 106 may be conducted as an initial assembly of the airfoil vane 100 or, alternatively, as part of a repair or replacement process. For example, the baffle 200 can be bolted, clamped, or otherwise joined to either of the airfoil section 106, the adjacent structures in the engine 20, or both.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An airfoil vane, comprising:
an airfoil section including an outer wall that defines an internal cavity; and
a baffle situated in the internal cavity, the baffle including a leading edge portion and a trailing edge portion bonded to the leading edge portion at a joint, wherein the leading edge portion and the trailing edge portion define an internal cavity therewithin, wherein both the leading edge portion and the trailing edge portion include a plurality of cooling holes configured to provide cooling air to the airfoil outer wall, wherein the trailing edge portion is formed of sheet metal and the leading edge portion is formed of non-sheet-metal, and wherein the leading edge portion comprises a first side and a separate second side, the first and second sides joined together by a weld joint.

2. The airfoil vane of claim 1, wherein the leading edge portion includes a neck forward of the joint.

3. The airfoil vane of claim 1, wherein the joint includes a step formed on the leading edge portion, a forward edge of the trailing edge portion disposed in the step.

4. The airfoil vane of claim 3, wherein the step is disposed inside the trailing edge portion.

5. The airfoil vane of claim 4, wherein the step defines a weld surface, and the weld surface has a length L that is between 0.008 and 0.125 inches (0.020 and 0.32 cm).

6. The airfoil vane of claim 4, wherein the step defines a weld surface with a length that is between 0.008 and 0.125 inches.

7. The airfoil vane of claim 1, wherein the leading edge portion is sintered metal.

8. The airfoil vane of claim 1, wherein the trailing edge portion is situated at a trailing edge of the airfoil section, and wherein a width of the trailing edge of the airfoil section is less than 0.01 inches (0.254 cm).

9. The airfoil vane of claim 1, wherein the leading edge portion includes standoffs extending from a wall of the leading edge portion.

10. The airfoil vane of claim 1, wherein the airfoil vane comprises a ceramic matrix composite material.

11. The airfoil vane of claim 1, wherein the airfoil vane comprises a metallic material.

12. An airfoil vane, comprising:
an airfoil section including an outer wall that defines an internal cavity; and
a baffle situated in the internal cavity, the baffle including a leading edge portion and a trailing edge portion bonded to the leading edge portion at a joint, wherein the leading edge portion and the trailing edge portion define an internal cavity therewithin, wherein both the leading edge portion and the trailing edge portion include a plurality of cooling holes configured to provide cooling air to the airfoil outer wall, wherein the trailing edge portion is formed of sheet metal and the leading edge portion is formed of non-sheet-metal, and wherein the leading edge portion comprises a first side and a separate second side, the first and second sides joined together, wherein the baffle has a chord length expressed as a percentage, wherein 0% corresponds to the leading edge of the baffle and 100% corresponds to the trailing edge of the baffle and wherein the joint begins at a smaller percent of the chord length at a radially inner end of the baffle and ends at a larger percent of the chord length at a radially outer end of the baffle.

13. The airfoil vane of claim 12, wherein the leading edge portion includes a neck forward of the joint.

14. The airfoil vane of claim 12, wherein the joint includes a step formed on the leading edge portion, a forward edge of the trailing edge portion disposed in the step.

15. The airfoil vane of claim 14, wherein the step is disposed inside the trailing edge portion.

16. The airfoil vane of claim 12, wherein the leading edge portion is sintered metal.

17. The airfoil vane of claim 12, wherein the trailing edge portion is situated at a trailing edge of the airfoil section, and wherein a width of the trailing edge of the airfoil section is less than 0.01 inches (0.254 cm).

18. The airfoil vane of claim 12, wherein the leading edge portion includes standoffs extending from a wall of the leading edge portion.

19. The airfoil vane of claim 12, wherein the joint is at a same percent chord length on first and second sides of the baffle, the first and second sides of the baffle each joining the leading edge of the baffle to the trailing edge of the baffle.

20. The airfoil vane of claim 12, wherein the joint is at a different percent chord length on first and second sides of the baffle, the first and second sides of the baffle each joining the leading edge of the baffle to the trailing edge of the baffle.

* * * * *